United States Patent
Meaney

(10) Patent No.: US 7,375,509 B2
(45) Date of Patent: May 20, 2008

(54) SYSTEM AND METHOD FOR POSITION SENSING USING INFLECTION POINT POSITION SENSING OF A SENSOR OUTPUT

(75) Inventor: Todd Meaney, West Roxbury, MA (US)

(73) Assignee: Stoneridge Control Devices, Inc., Canton, MA (US)

(*) Notice: Subject to any disclaimer, the term of this patent is extended or adjusted under 35 U.S.C. 154(b) by 0 days.

(21) Appl. No.: 11/366,215

(22) Filed: Mar. 2, 2006

(65) Prior Publication Data

US 2006/0202676 A1    Sep. 14, 2006

Related U.S. Application Data

(60) Provisional application No. 60/657,918, filed on Mar. 2, 2005.

(51) Int. Cl.
G01B 7/14     (2006.01)

(52) U.S. Cl. ............................. 324/207.2; 324/207.24

(58) Field of Classification Search ........ 324/160–174, 324/207.12–207.26
See application file for complete search history.

(56) References Cited

U.S. PATENT DOCUMENTS

| 3,596,114 | A | * | 7/1971 | Maupin et al. ............. 327/480 |
| 4,283,679 | A | * | 8/1981 | Ito et al. .................... 324/165 |
| 4,737,710 | A | * | 4/1988 | Van Antwerp et al. .. 324/207.2 |
| 4,808,933 | A | * | 2/1989 | Kobayashi et al. ......... 324/163 |
| 4,868,497 | A | * | 9/1989 | Wallrafen ................... 324/160 |
| 5,612,618 | A | * | 3/1997 | Arakawa ............... 324/207.25 |
| 5,721,486 | A | * | 2/1998 | Pape ..................... 324/207.25 |
| 6,201,389 | B1 | * | 3/2001 | Apel et al. ............... 324/207.2 |
| 6,924,639 | B2 | * | 8/2005 | Uenoyama ............ 324/207.21 |

FOREIGN PATENT DOCUMENTS

| GB | 2197483 A | * | 5/1988 |
| JP | 05038124 | | 2/1993 |
| JP | 09229612 | | 9/1997 |

* cited by examiner

Primary Examiner—Jay M Patidar
(74) Attorney, Agent, or Firm—Grossman, Tucker, Perreault & Pfleger, PLLC

(57) ABSTRACT

A position sensor includes a magnet and a sensor element that are movable relative to one another. The sensor element is capable of providing an output in response to a position of the magnet relative to the sensor element. Relative position sensing between the sensor element, such as a Hall Effect sensor, and the magnet may be determined by way of circuitry for detection of an approximate inflection point in the output of the sensor.

21 Claims, 7 Drawing Sheets

SYSTEM AND METHOD FOR POSITION SENSING USING INFLECTION POINT POSITION SENSING OF A SENSOR OUTPUT

CROSS-REFERENCE TO RELATED APPLICATIONS

This application claims the benefit of U.S. provisional patent application Ser. No. 60/657,918, filed Mar. 2, 2005, the entire disclosure of which is incorporated herein by reference.

FIELD

This invention relates in general to position sensing, and, in particular, to position sensing using the infection point of a sensor output.

BACKGROUND

Magnetic field sensors, such as Hall Effect sensors, are commonly used for sensing the relative position of one object to another. Such sensors generally provide an output dependent upon the level of magnetic flux imparted thereto. For example, sensing the relative position of one object to another may be achieved by affixing a Hall Effect sensor to one object and a magnet to the other object. As the sensor and/or the magnet are moved relative to each other, the magnetic flux imparted to the sensor varies causing associated changes in the sensor output. The sensor output may therefore be indicative of the position of the magnet.

In one configuration, the sensor may provide a binary "on" or "off" output when the magnetic flux imparted to the sensor increases or decreases beyond certain thresholds. In another configuration, the sensor may provide a linear output whereby each value of magnetic flux within a range of flux values causes a different associated sensor output, e.g. between upper and lower limits. The output of such a linear Hall Effect sensor may be indicative of the absolute position of the magnet relative to the sensor.

Magnetic field sensor position sensing configurations are effective, but involve sources of position sensing error, such as manufacturing and environmental conditions, that complicate design and limit performance. For example, the air gap, i.e. the distance between the magnet and the sensor when the magnet and sensor are in the closest relative positions, affects the flux imparted to the sensor and, thus, the sensor output. Manufacturing tolerances in the air gap may, therefore, impact position sensing. Generally, in a given configuration as the air gap is increased, the magnetic flux imparted to the sensor may significantly decrease. The maximum magnetic flux imparted to the sensor can, therefore, be significantly affected by the air gap.

Temperature variation may have a similar effect on magnetic flux imparted to a magnetic field sensor, such as a Hall Effect sensor. For example, the maximum magnetic flux imparted by a magnet may vary significantly over an anticipated application temperature range. Variation in magnetic flux can affect the performance of the position sensing system.

Additionally, as is known, Hall Effect sensors typically exhibit a range of magnetic flux values for which the sensor may, or may not, turn "on" to provide an output. For values above the range, the sensor may definitely be on, and for values below the range the sensor may definitely be off. The range of magnetic flux values for which the sensor may or may not turn "on", i.e., above the definitely off value and below the definitely on value, is known as the "pink" zone of the Hall Effect sensor. Travel positions of a magnet which impart a magnetic flux within the "pink" zone of the Hall Effect sensor are known as the switching "gray" or "unknown" zones. When the magnet is in the "gray" zones the Hall Effect sensor may or may not turn on the Hall Effect sensor to provide an output. Variations in the magnetic flux imparted on the Hall Effect sensor by the magnet, e.g., due to air gap variation, temperature conditions, etc., may produce wide unknown zone in a position sensing system. The wide switching unknown zones may be narrowed using various mechanical techniques. These mechanical techniques, however, can also provide a source of error in position sensing.

There is therefore a need for a position sensing system and method wherein variations in magnetic flux imparted to a sensor due to manufacturing and environmental conditions is reduced or eliminated.

BRIEF DESCRIPTION OF THE DRAWINGS

Features and advantages of the claimed subject matter are set forth by the description of various embodiments consistent therewith, which description should be considered in conjunction with the accompanying drawings, in which:

Although the following Detailed Description will proceed with reference being made to illustrative embodiments, many alternatives, modifications, and variations thereof will be apparent to those skilled in the art. Accordingly, it is intended that the subject matter be viewed broadly.

DETAILED DESCRIPTION

For simplicity and ease of explanation, various embodiments will be described herein. It is to be understood, however, that the embodiments described herein are presented by way of illustration, not of limitation. For example, the exemplary embodiments described herein may include the use of Hall Effect sensors. Those skilled in the art will recognize, however, that a variety of sensing elements may be used in connection with the present invention. Sensor elements consistent with the present invention may be capable of providing an output in response to a position of a magnet relative to the sensor element. Such sensor elements may be capable of providing an output in response to a position of a magnet relative to the sensor element, alone or in combination with other circuitry, components, etc. Examples of sensor elements consistent with the present invention may include Hall Effect sensors, fluxgate sensors, magneto-resistive sensors, reed switches, etc. It is to be understood, therefore, that illustrated exemplary embodiments described herein are provided only by way of illustration, and are not intended to be limiting.

A system and method consistent with the invention may facillitates accurate relative position sensing between a sensor element, such as a Hall Effect sensor, and a magnet through detection of an approximate inflection point in the output of the sensor element. An inflection point is a point on a curve where the slope of the curve equals zero as the slope changes sign. It has been recognized that the inflection point of plots of the output of the sensor element, e.g., plots of magnetic flux imparted to to a Hall Effect sensor, as a magnet moves relative to the sensor element may occur in the same location regardless of magnet air gap, magnet strength, and ambient temperature. Since the output of the sensor element may be dependent upon the position of the magnet relative to the sensor element, e.g., the output may be dependent upon magnetic flux imparted to the sensor, the sensor element may exhibit an output having a consistent inflection point regardless of air gap and/or temperature. Accurate sensing of the position of magnet relative to the sensor element may thus be determined through detection of an inflection point in the output of the sensor element.

Figure 1:
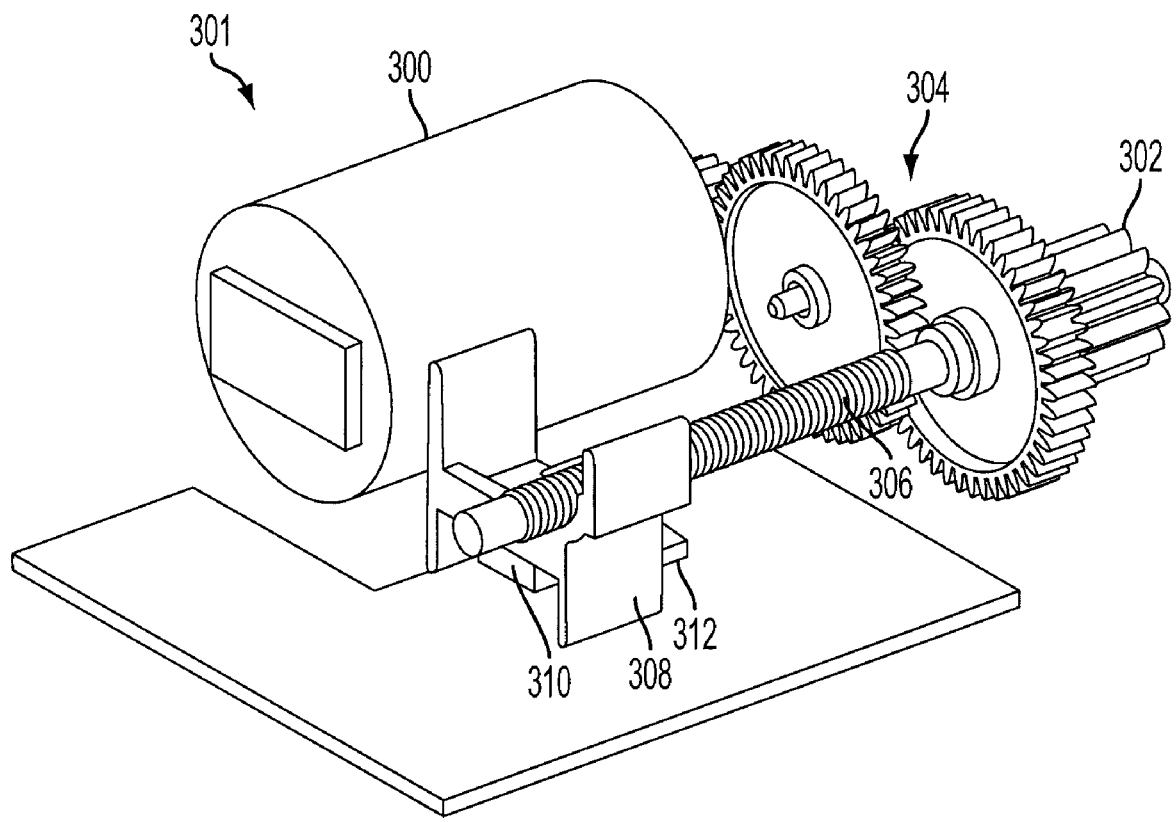
FIG. 1 is perspective view of one exemplary embodiment of an actuator including inflection point position sensing consistent with the present invention.
Figure 2A:
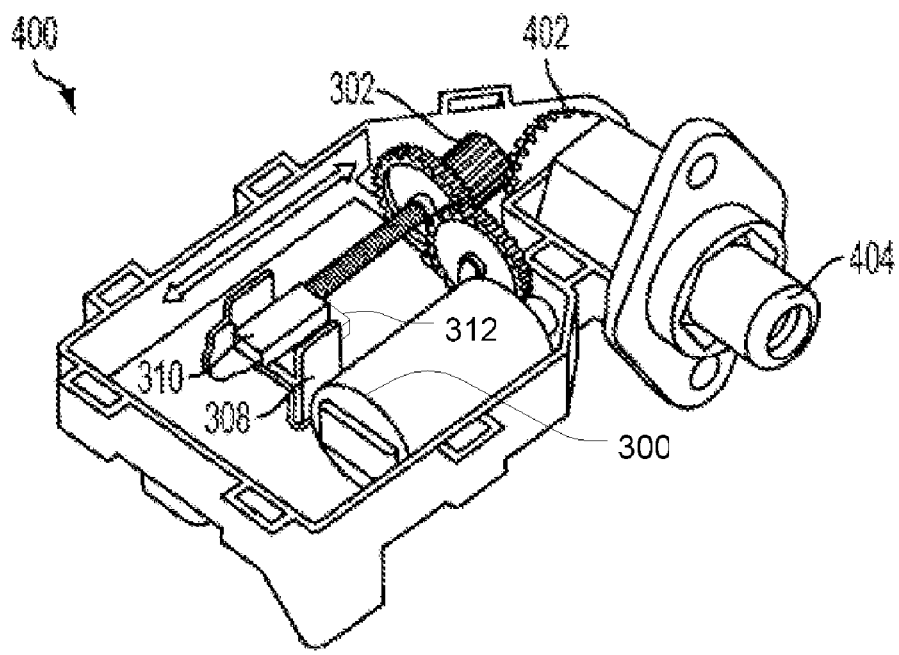
FIGS. 2A-2B are perspective views of the exemplary actuator of FIG. 1 configured in an actuator system.
Figure 2B:
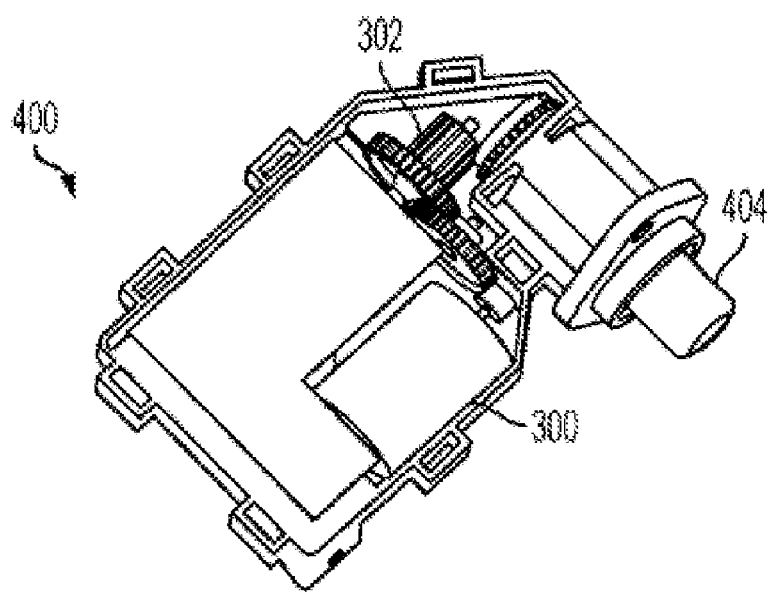

FIG. 1 illustrates one exemplary embodiment of an actuator 301 including inflection point position sensing consistent with the present invention. The illustrated exemplary actuator 301 includes a motor 300 which may drive an output gear 302 through a gear train 304. As shown with additional reference to FIGS. 2A-2B, the output gear 302 may be configured in a system 400, e.g. in a transfer case actuator system, for driving additional gears 402 and/or elements 404. As illustrated, the output gear 302 may include a position sensing shaft 306 extending therefrom. The position sensing shaft 306 may be configured as a lead screw and may carry a magnet carrier 308 thereon. The magnet carrier 308 may move linearly along the position sensing shaft 306 in a direction depending on the direction of rotation of the output gear 302.

A permanent magnet 310 may be affixed to the bottom of the carrier 308 and a sensor element 312, for example a linear Hall Effect sensor, may be secured to a fixed position beneath the position sensing shaft 306, as shown. The output of the sensor element 312 may provide an indication as to the position of the magnet 310 along the shaft 306, as described above. Accordingly, the sensor element 312 may be capable of providing an output in response to, or based on, a position of the magnet 310 relative to the sensor element 312. The output of the sensor element 312 may be indicative of the position of any gears and/or elements driven by the output gear 302. Position sensing consistent with the present invention may be used in such a system, for example, to energize or de-energize the motor 300 to achieve a desired number of rotations for the output gear or desired position of any driven gears/elements.

The illustrated embodiment provides an actuator which may include a magnet which may be moved relative to the sensor element in response to the actuator output being driven by the actuator motor. In a more general sense, the present disclosure may relate to any system including a magnet and a sensor element which are capable of moving relative to one another. In the context of an actuator, the magnet and the sensor element may be capable of moving relative to one another in response to the actuator output being driving by the actuator motor. An arrangement consistent with the present invention may be realized in various systems other than actuators. For example, in the context of a seat position sensor, a magnet and sensor element may be provided movable relative to one another, e.g., the magnet may be configured to move with a seat and the sensor element may remain stationary, e.g., by being coupled to a vehicle structure. A magnet and sensor element may be provided movable relative to one another consistent with the present invention in various other position or movement sensing applications.

Identifying inflection points in the output of a sensor element for position sensing consistent with the present invention may be accomplished using digital or analog means. The digital or analog means for identifying inflection points may include circuitry capable of providing an output in response to an inflection point of the output of the sensor element. As used in any embodiment described herein, "circuitry" may include, for example, singly or in any combination, hardwired circuitry, programmable circuitry, state machine circuitry, and/or firmware that stores instructions executed by programmable circuitry. As mentioned above, the sensor element may be capable of providing an output in response to a position of a magnet relative to the sensor element. Suitable sensor elements may be capable of providing the output in response to a position of the magnet relative to the sensor element either alone or in combination with appropriate circuitry or as part of a system including additional components.

Figure 3A:
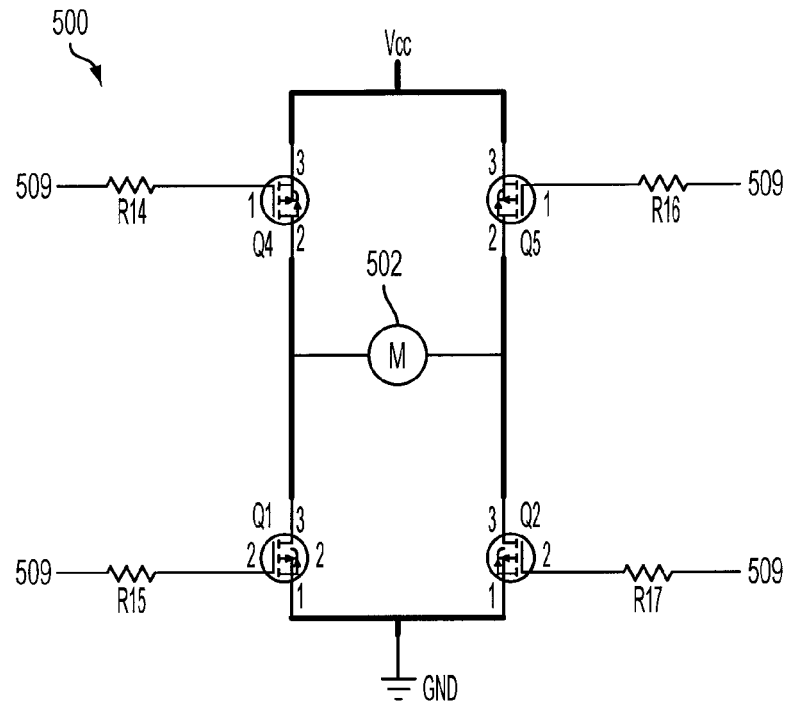
FIGS. 3A-3B provide schematic illustration of an exemplary digital bi-directional motor drive configuration consistent with the present invention.
Figure 3B:
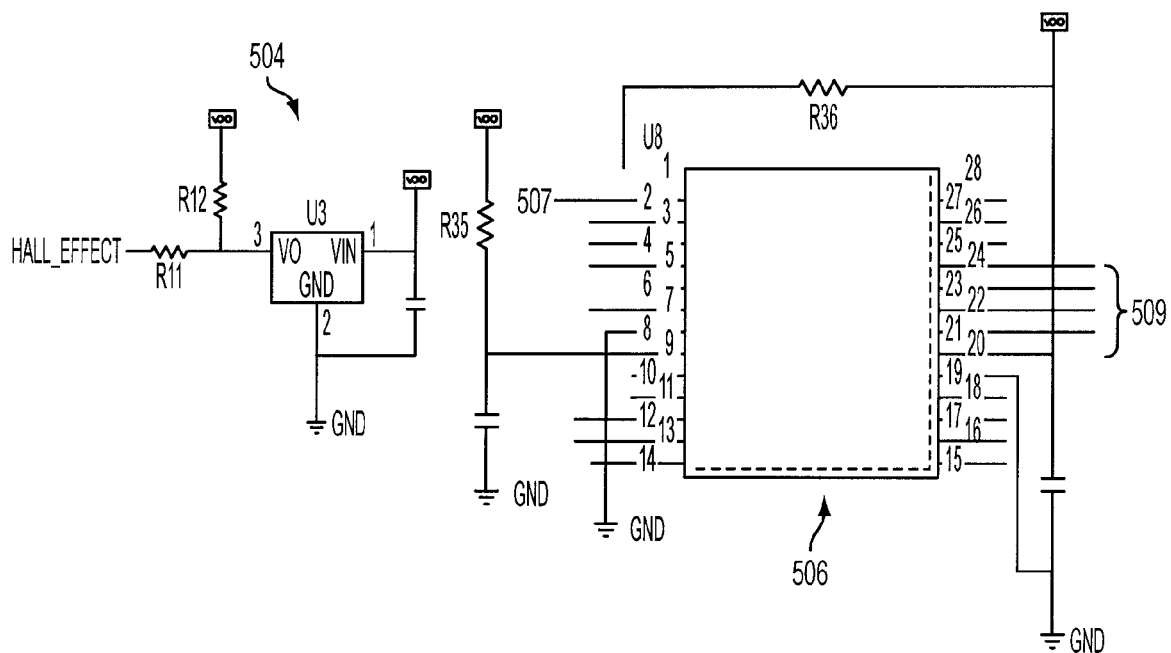

Referring to FIGS. 3A-3B, there is shown an example of a schematic illustration of one embodiment 500 of a digital configuration for bi-directionally driving a motor 502 in response to inflection points of an output of a Hall Effect sensor 504. As shown, the Hall Effect sensor output 507 may be coupled to a microprocessor 506 configured according to a set of pre-programmed instructions to determine when an inflection point occurs in the output 507 and to drive the motor in response thereto. The processor 506 may provide outputs 509, collectively, for driving the motor 502 in response to identified inflection points in the output 507 of the Hall Effect sensor 504.

Figure 4:
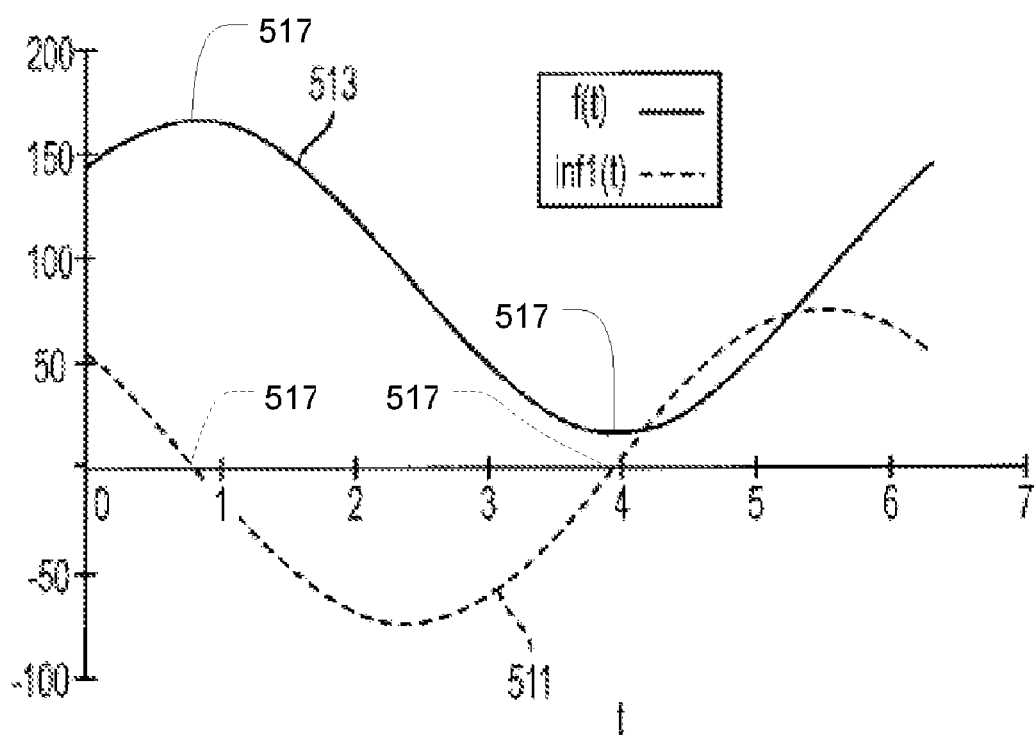
FIG. 4 illustrates an exemplary continuous math method of determining inflection points consistent with the present invention.
Figure 5:
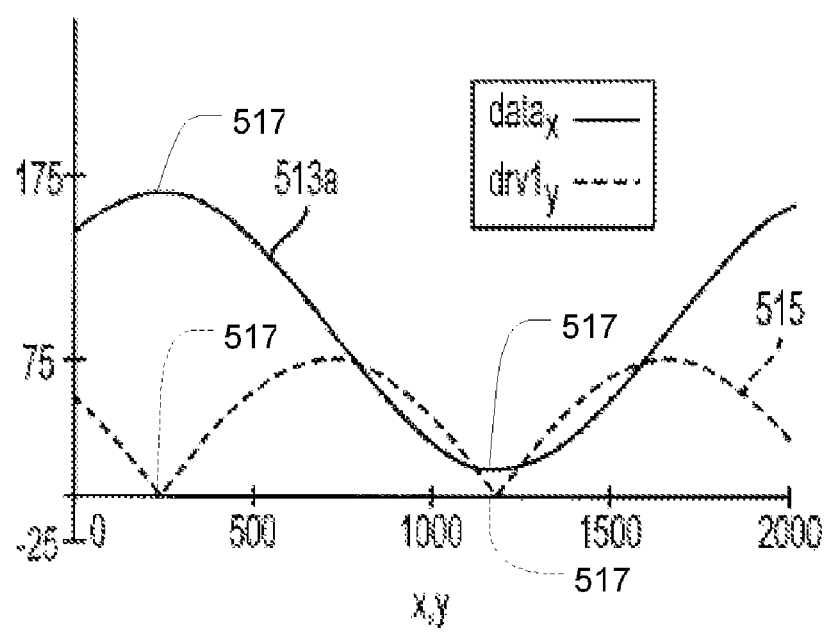
FIG. 5 illustrates an exemplary discrete real-time method of determining inflection points consistent with the present invention.

In one exemplary embodiment, since an inflection point in the Hall sensor output occurs when the slope equals zero as the slope changes sign, the processor 506 may identify inflection points by taking the first derivative 511 of a function 513 representing the Hall sensor output and setting it equal to zero. FIG. 4 illustrates one example of continuous math calculations for identifying inflection points 517 consistent with the present invention. FIG. 5 illustrates one example of a discrete real time digital embodiment for determining an inflection point of a sensor element. As shown, the processor generally may identify the inflection points 517 of a function 513a representing the Hall sensor output as the absolute value of the first derivative 515 of the function 513a.

Figure 6:
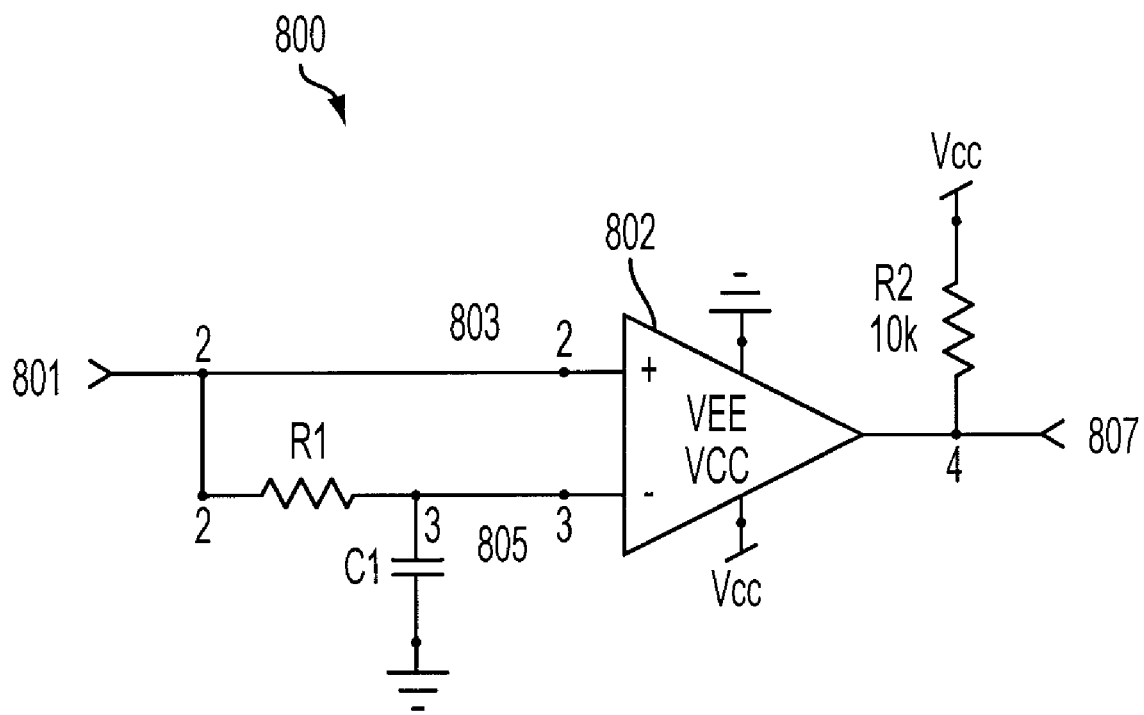
FIG. 6 is a schematic illustration of an exemplary analog circuit for identifying inflection points consistent with the present invention.
Figure 7:
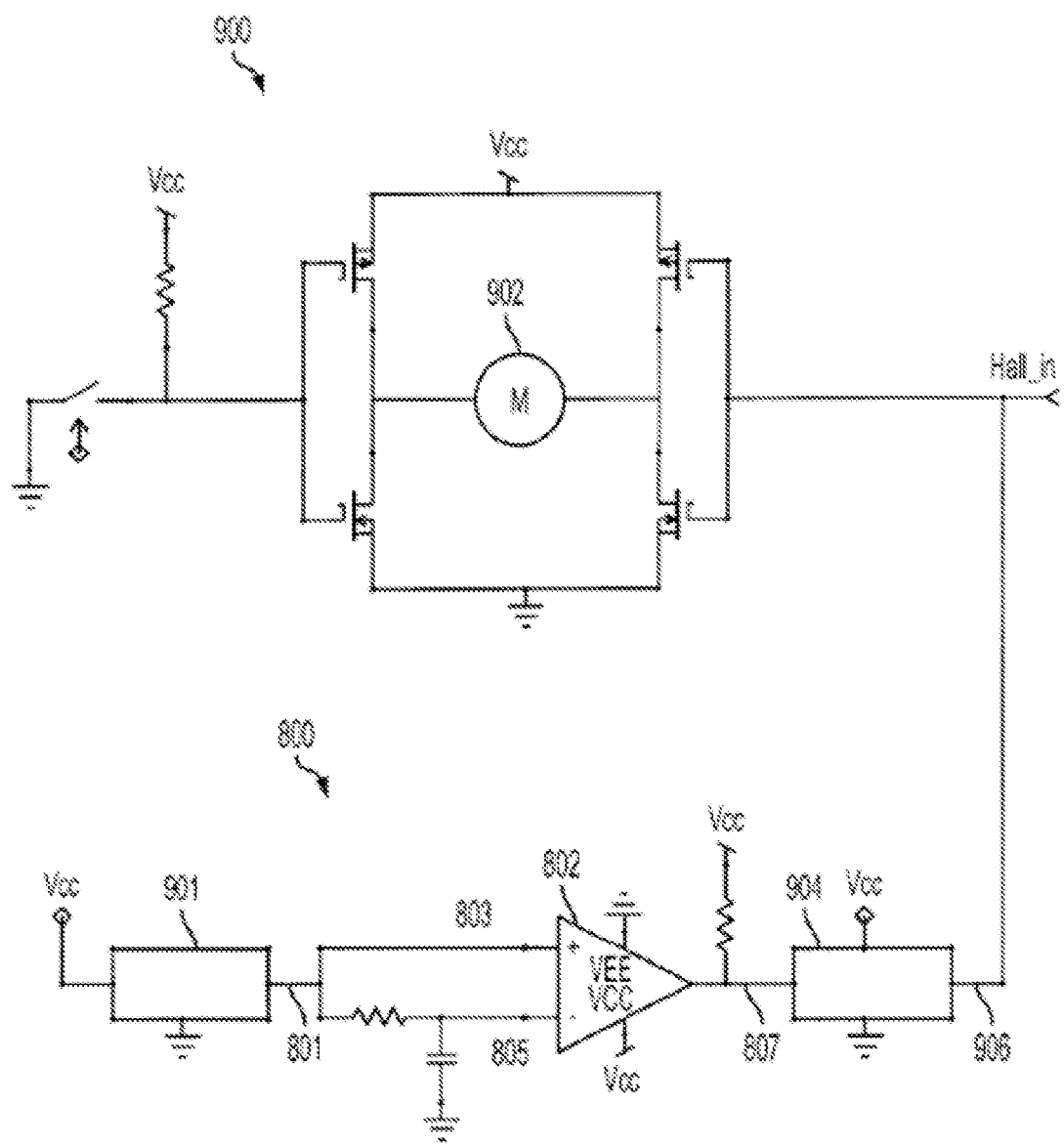
FIG. 7 is a schematic illustration of an exemplary analog bi-directional motor drive configuration consistent with the present invention.

FIG. 6 is a schematic illustration of one embodiment of an analog detection circuit 800 for identifying inflection points consistent with the present invention, and FIG. 7 is an analog configuration 900 for bi-directionally driving a motor 902 in response to inflection points using a circuit configured as shown in FIG. 6. Additionally, FIGS. 8A-8D are timing diagrams associated with the exemplary circuit illustrated in FIG. 6. As shown, the analog detection circuit 800 may include a comparator 802. The inputs 803, 805 to a comparator 802 may include the sensor element output 801 provided to the circuit 800 and a time delayed version of the sensor output. For example, the sensor element output 801 may be delayed by RC circuit established by R1 and C1. The comparator 802 may provide an output 807 which may binarily change state between Vcc and ground upon occurrence of an inflection point in the sensor element output 801. In the foregoing manner, the analog circuit 800 may be capable of providing an output in response to an inflection point of the sensor element output 801.

Referring to FIG. 7, consistent with the illustrated bi-directional motor control configuration 900, a sensor element 901 may provide an output 801 in response to the position of a magnet (not shown) relative to the sensor element. As described with reference to FIG. 6, the sensor element output 801 may be provided to the comparator 802, which may, in turn, provide an output 807 in response to in inflection point of the sensor element output 801. The comparator output 807 may be coupled to a latch circuit 904, and the output 906 of the latch circuit 904 may drive the motor 902.

Figure 8A:
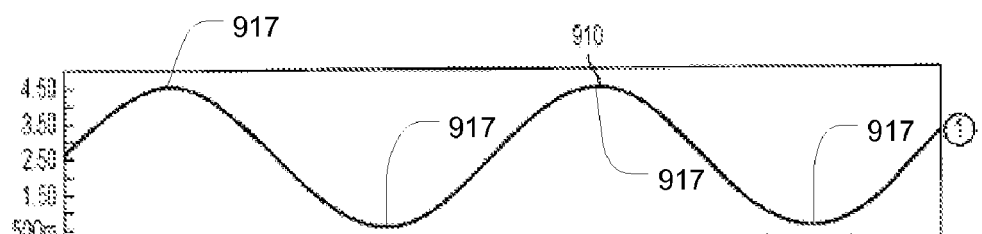
FIGS. 8A-8D provide a timing diagram associated with an exemplary circuit as shown in FIG. 6.
Figure 8B:
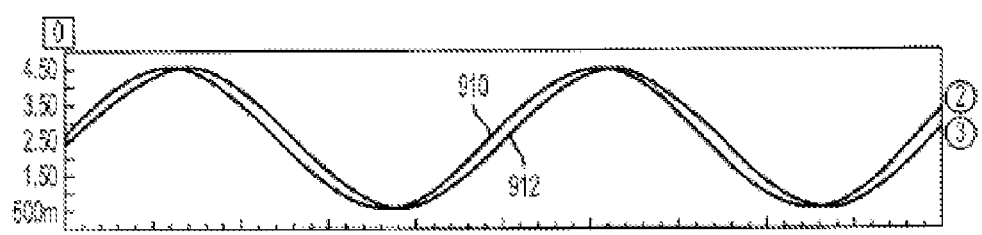
Figure 8C:
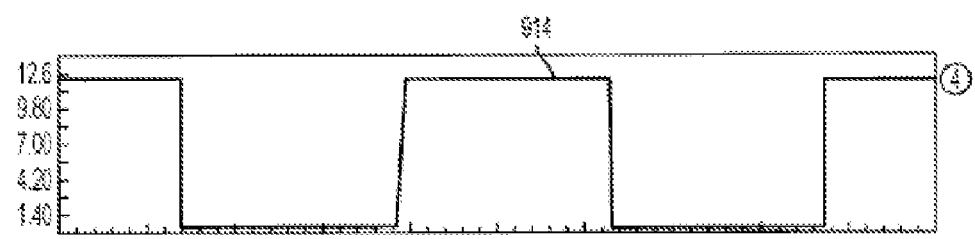
Figure 8D:
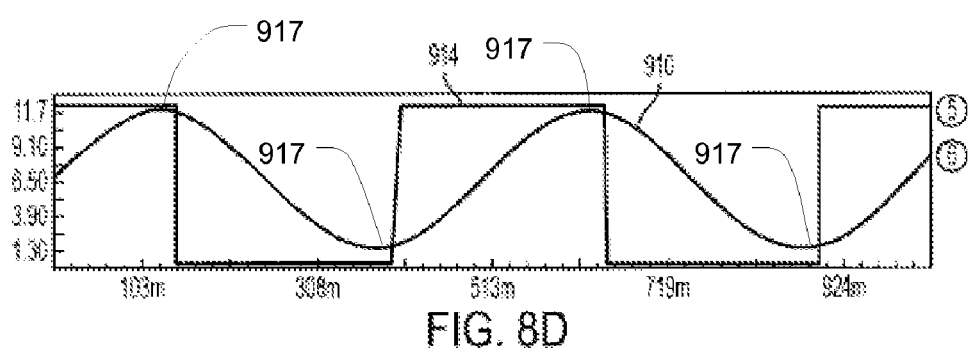

Referring to FIGS. 8A-8D, timing diagrams associated with the exemplary analog configuration for identifying inflection points of the sensor element output are shown. A sensor element output 910 is shown alone in FIG. 8A. The sensor element output 910 is shown together with a time delayed version 912 of the sensor element output in FIG. 8B. As described, the sensor element output 910 and the time delayed version 912 of the sensor element output may be provided to a comparator. An inflection point 917 may be determined based on a comparison of the sensor element output 910 to the time delayed version 912 of the sensor element output. The comparator may provide an output 914, which may change, e.g., between a high value (Vcc) and a low value (ground), in response to an inflection point 917 identified by the comparison of the sensor element output 910 and the time delayed version 912 of the sensor element output. As shown in FIG. 8D, the changes in comparator output 914 may generally correspond to the inflection points 917 of the sensor element output 910.

The exemplary digital and analog circuits capable of identifying inflection points of a sensor element output, and capable of providing an output in response to the inflection points have been described in the context of bi-directionally driving a motor, e.g., of an actuator. Of course, systems capable of providing an output in response to an inflection point of an output of sensor element may be used in connection with a variety of applications, including position sensing applications, motion sensing applications, etc.

Advantageously, inflection point position sensing consistent with the present invention may result in a reduced switching unknown "gray" zone, as compared to non-inflection point position sensing. In one configuration for example, inflection point position sensing may reduce switching unknown "gray" zones by about 2.7 mm at each end, leading to a positional accuracy of about +/-0.25 mm for an exemplary system consistent with the present invention compared to a positional accuracy of about +/-1.6 mm for a conventional system. This increased positional accuracy may be accomplished with little or no increased in cost. Of course this reduction in "gray" zones is provided by way of example, and should not be construed as limiting.

Consistent with the foregoing, according to one aspect of the present disclosure there may be provided a position sensor including a magnet and a sensor element capable of providing an output in response to a position of the magnet relative to the sensor element. The position sensor may also include circuitry which is capable of providing an output in response to an inflection point of the output of the sensor element.

According to another aspect of the present disclosure, there may be provided a system including a magnet and a sensor element, in which the magnet and the sensor element may be movable relative to one another. The sensor element may be capable of providing an output in response to a position of the magnet relative to the sensor element. The system may further include circuitry capable of providing an output in response to an inflection point of the output of the sensor element.

According to yet another aspect of the present disclosure, a method may be provided including providing a magnet, and providing a sensor element, in which the magnet and the sensor element may be movable relative to one another. The method may further include providing an output of the sensor element based on a position of the magnet relative to the sensor element, and determining an inflection point of the output of the sensor element.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A position sensor comprising:
   a magnet;
   a sensor element configured to provide an output in response to a position of said magnet relative to said sensor element, said sensor element and said magnet movable relative to one another; and
   circuitry configured to provide an output in response to an inflection point of said output of said sensor element, said circuitry comprising an analog circuit comprising a comparator configured to compare said output of said sensor element to a time delayed output of said sensor element.

2. A position sensor according to claim 1, wherein said sensor element comprises a Hall effect sensor.

3. A position sensor according to claim 1 wherein said output signal of said sensor element comprises a magnetic flux signal, wherein said circuitry is configured to provide said output in response to an inflection point of said magnetic flux signal.

4. A system comprising:
   a magnet;
   a sensor element, said magnet and said sensor element movable relative to one another, and said sensor element configured to provide an output in response to a position of said magnet relative to said sensor element;
   circuitry configured to provide an output in response to an inflection point of said output of said sensor element; and
   an actuator comprising a motor coupled to drive an actuator output, said magnet and said sensor element configured to move relative to one another in response to said actuator output being driven by said motor, wherein said motor is configured to be energized or de-energized in response to said output of said circuitry.

5. A system according to claim 4, wherein said motor is coupled to one of said magnet or said sensor element for driving one of said magnet or said sensor element relative to the other of said magnet or said sensor element.

6. A system according to claim 5, wherein said motor is coupled to one of said magnet or said magnetic sensor element by a lead screw driven by said motor.

7. A system according to claim 4, wherein said circuitry configured to provide said output in response to said inflection point of said output of said sensor element comprises a microprocessor configured to determine said inflection point of said output of said sensor element.

8. A system according to claim 7, wherein said microprocessor determines said inflection point based on a derivative of a function representative of said output of said sensor element.

9. A system according to claim 4, wherein said circuitry configured to provide said output in response to said inflection point of said output of said sensor element comprises an analog circuit.

10. A system according to claim 9, wherein said analog circuit comprises a comparator configured to compare said output of said sensor element to a time delayed output of said sensor element.

11. A system according to claim 4 wherein said output signal of said sensor element comprises a magnetic flux signal, wherein said circuitry is configured to provide said output in response to an inflection point of said magnetic flux signal.

12. A method comprising:
providing a magnet;
providing a sensor element, said magnet and said sensor element movable relative to one another;
providing an output of said sensor element based on a position of said magnet relative to said sensor element; and
determining an inflection point of said output of said sensor element comprising comparing said output of said sensor element to a time delayed output of said sensor element.

13. A method according to claim 12, further comprising generating an output signal based on the determined inflection point of said output of said sensor element to drive a motor.

14. A method according to claim 12, wherein providing said sensor element comprises providing a Hall Effect sensor.

15. A method according to claim 12 wherein said output signal of said sensor element comprises a magnetic flux signal, wherein determining said inflection point of said output of said sensor element comprises determining an inflection point of said magnetic flux signal.

16. A system comprising:
a magnet;
a sensor element, said magnet and said sensor element movable relative to one another, and said sensor element configured to provide an output in response to a position of said magnet relative to said sensor element;
circuitry configured to provide an output in response to an inflection point of said output of said sensor element, said circuitry comprising an analog circuit comprising a comparator configured to compare said output of said sensor element to a time delayed output of said sensor element; and
an actuator comprising a motor coupled to drive an actuator output, said magnet and said sensor element configured to move relative to one another in response to said actuator output being driven by said motor.

17. A system according to claim 16, wherein said motor is coupled to one of said magnet or said sensor element for driving one of said magnet or said sensor element relative to the other of said magnet or said sensor element.

18. A system according to claim 17, wherein said motor is coupled to one of said magnet or said magnetic sensor element by a lead screw driven by said motor.

19. A method comprising:
providing a magnet;
providing a sensor element, said magnet and said sensor element movable relative to one another;
providing an output of said sensor element based on a position of said magnet relative to said sensor element;
determining an inflection point of said output of said sensor element; and
generating an output signal based on the determined inflection point of said output of said sensor element to drive a motor.

20. A method according to claim 19, wherein determining said inflection point of said output of said sensor element comprises determining a derivative of a function representative of said output of said sensor element.

21. A method according to claim 19, wherein providing said sensor element comprises providing a Hall Effect sensor.

* * * * *